United States Patent
Thomas et al.

(10) Patent No.: US 12,444,756 B2
(45) Date of Patent: Oct. 14, 2025

(54) MEMBRANE ELECTRODE AND FRAME ASSEMBLY FOR FUEL CELL STACKS AND METHOD FOR MAKING

(71) Applicants: AVL List GmbH, Graz (AT); AVL Fuel Cell Canada Inc., Burnaby (CA)

(72) Inventors: Owen Thomas, Vancouver (CA); Max Cimenti, Vancouver (CA); Emerson Gallagher, Vancouver (CA)

(73) Assignees: AVL List GmbH, Graz (AT); AVL Fuel Cell Canada Inc., Burnaby (CA)

( * ) Notice: Subject to any disclaimer, the term of this patent is extended or adjusted under 35 U.S.C. 154(b) by 659 days.

(21) Appl. No.: 17/792,716

(22) PCT Filed: Jan. 29, 2021

(86) PCT No.: PCT/AT2021/060032
§ 371 (c)(1),
(2) Date: Jul. 14, 2022

(87) PCT Pub. No.: WO2021/151135
PCT Pub. Date: Aug. 5, 2021

(65) Prior Publication Data
US 2023/0048138 A1 Feb. 16, 2023

(30) Foreign Application Priority Data

Jan. 30, 2020 (CA) ................ CA 3070363

(51) Int. Cl.
*H01M 8/0284* (2016.01)
*H01M 8/0273* (2016.01)
(Continued)

(52) U.S. Cl.
CPC ....... *H01M 8/0284* (2013.01); *H01M 8/0273* (2013.01); *H01M 8/0286* (2013.01);
(Continued)

(58) Field of Classification Search
None
See application file for complete search history.

(56) References Cited

U.S. PATENT DOCUMENTS 10,290,878 B2  5/2019  Ikeda et al.
2008/0118802 A1  5/2008  Szrama
(Continued)

FOREIGN PATENT DOCUMENTS

CN  102714322  10/2012

OTHER PUBLICATIONS

Notification of Office Action and Search Report Dated Dec. 4, 2023 From The State Intellectual Property Office of the People's Republic of China Re. Application No. 202180011140.7. (8 Pages).
(Continued)

*Primary Examiner* — Alix E Eggerding

(57) ABSTRACT

Simple membrane electrode and frame assemblies for a solid polymer electrolyte fuel cell stack and improved methods for making them are disclosed which involve the use of a single adhesive layer. Using an appropriate design, the single adhesive layer can provide multiple bonds, including a bond between one of the gas diffusion layers and a catalyst coated membrane assembly, between the catalyst coated portion of the catalyst coated membrane assembly and the frame, and between either the other of the gas diffusion layers and the frame, or between an uncoated portion of the catalyst coated membrane assembly and the frame.

15 Claims, 3 Drawing Sheets

(51) Int. Cl.
  *H01M 8/0286* (2016.01)
  *H01M 8/1004* (2016.01)
  *H01M 8/1018* (2016.01)
  *H01M 8/2465* (2016.01)
  *H01M 8/10* (2016.01)

(52) U.S. Cl.
  CPC ....... *H01M 8/1004* (2013.01); *H01M 8/1018* (2013.01); *H01M 8/2465* (2013.01); *H01M 2008/1095* (2013.01)

(56) References Cited

U.S. PATENT DOCUMENTS

| | | | |
|---|---|---|---|
| 2010/0112405 A1* | 5/2010 | Peters | H01M 8/1004 429/513 |
| 2011/0177423 A1 | 7/2011 | Nachtmann et al. | |
| 2014/0099564 A1* | 4/2014 | Beutel | H01M 8/0273 429/482 |
| 2015/0357656 A1* | 12/2015 | Farrington | H01M 8/1007 156/247 |
| 2016/0087299 A1* | 3/2016 | Van Dyke | H01M 8/04201 429/535 |
| 2020/0153001 A1* | 5/2020 | Keite-Telgenbüscher | C25B 9/19 |

OTHER PUBLICATIONS

International Search Report and the Written Opinion Dated May 14, 2021 From the International Searching Authority Re. Application No. PCT/AT2021/060032. (9 Pages).

* cited by examiner

MEMBRANE ELECTRODE AND FRAME ASSEMBLY FOR FUEL CELL STACKS AND METHOD FOR MAKING

RELATED APPLICATIONS

This application is a National Phase of PCT Patent Application No. PCT/AT2021/060032 having International filing date of Jan. 29, 2021, which claims the benefit of priority of Canada Patent Application No. 3,070,363 filed on Jan. 30, 2020. The contents of the above applications are all incorporated by reference as if fully set forth herein in their entirety.

FIELD AND BACKGROUND OF THE INVENTION

This invention relates to membrane electrode and frame assemblies for solid polymer electrolyte fuel cell stacks and to methods for making them. In particular, it relates to designs and methods involving a single adhesive layer.

Fuel cells are devices that generate electric power by electrochemically converting fuel and oxidant reactants, such as hydrogen and oxygen or air. A solid polymer electrolyte fuel cell is one type of fuel cell which employs a proton conducting, solid polymer membrane electrolyte between cathode and anode electrodes. The electrodes typically comprise appropriate catalysts to promote the electrochemical reactions taking place at each electrode. A structure comprising a solid polymer membrane electrolyte sandwiched between these two electrodes is known as a membrane electrode assembly (MEA). In a common embodiment, the MEA comprises a catalyst coated membrane (CCM) and gas diffusion layers (GDLs) applied on each side of the CCM. The CCM is a convenient subassembly in which appropriate catalyst compositions have been applied and bonded to either side of the membrane electrolyte. The GDLs are provided to improve both the distribution of the fluid reactants to the electrodes and the removal of fluid by-products from the electrodes.

In a typical solid polymer electrolyte fuel cell, flow field plates comprising numerous fluid distribution channels for the reactants are provided on either side of a MEA to distribute fuel and oxidant to the respective electrodes and to remove reaction by-products from the fuel cell. Water is the primary by-product in a cell operating on hydrogen and air reactants. Because the output voltage of a single cell is of order of 1V, a plurality of cells is usually stacked together in series for commercial applications in order to provide a higher output voltage. Fuel cell stacks can be further connected in arrays of interconnected stacks in series and/or parallel for use in automotive applications and the like.

Along with water, heat is a significant by-product from the electrochemical reactions taking place within the fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields are typically formed on the electrochemically inactive surfaces of both the anode side and cathode side flow field plates and, by appropriate design, a sealed coolant flow field is created when both anode and cathode side plates are mated together into a bipolar flow field plate assembly.

To efficiently manufacture such fuel cell stacks, numerous identical cell assemblies known as unit cell assemblies are usually prepared with an appropriate design such that they can simply be stacked, one on top of the other, to complete most of the assembly of the stack. Special end cell assemblies may be required at the ends of the stack to properly complete the assembly.

A typical unit cell assembly comprises a MEA (e.g. a CCM with GDLs applied on each side thereof) bonded to a bipolar flow field plate assembly. Various designs and assembly methods have been proposed in the art in order to achieve the numerous seals and bonds required in the fuel cell stack. In one approach, the unit cell assembly comprises a film frame (typically made of plastic) which is used in the MEA in to provide electrical isolation, mechanical alignment, and sealing functions. In such embodiments, the film frame and MEA are often incorporated together into a subassembly known as a membrane electrode frame assembly or MEFA. Further, adhesives and/or adhesive layers are usually employed to bond the various components together.

US20150357656 discloses an exemplary fuel cell assembly from the prior art in which a plastic film frame is used to frame a catalyst coated membrane within. In one embodiment, the plastic film frame is adhesive coated on one side and laminated at its inner edge to one surface of the catalyst coated membrane and at its outer edge to the flow field plate on the opposite side. In another embodiment, the plastic film frame is laminated to sealing features incorporated in a transition region in the flow field plate.

US10290878 discloses a further exemplary embodiment from the prior art in which a fuel cell comprises a membrane electrode assembly configured such that electrode catalyst layers are formed on respective surfaces of an electrolyte membrane; gas diffusion layers placed on respective surfaces of the membrane electrode assembly; and a frame placed around periphery of the membrane electrode assembly. The membrane electrode assembly has a protruding portion that is configured by protruding outside of the gas diffusion layer in a state that the membrane electrode assembly is combined with the gas diffusion layers. The frame has an engagement portion that is configured to engage with the protruding portion. An adhesive layer is formed from an ultraviolet curable adhesive between the protruding portion and the engagement portion.

While a great deal of consideration has gone into developing the various subassemblies used in solid polymer electrolyte fuel cells, there remains a continuing desire for additional simplification and efficiency in the manufacture of these parts.

SUMMARY OF THE INVENTION

The present invention relates to an improved, simple membrane electrode and frame assembly (MEFA) design for a solid polymer electrolyte fuel cell stack and methods for making. A single adhesive layer is used to provide multiple bonds and thereby bond all the components in the MEFA together. The design also can provide for a desirable reduction in thickness discontinuities appearing within certain prior art MEFA designs.

Specifically, a membrane electrode and frame assembly (MEFA) of the invention comprises the following components: a catalyst coated membrane assembly, an anode gas diffusion layer, a cathode gas diffusion layer, a frame, and an adhesive layer. The catalyst coated membrane assembly comprises an anode catalyst layer, a cathode catalyst layer, and a solid polymer membrane electrolyte in which the anode and cathode catalyst layers are bonded to opposite sides of the solid polymer membrane electrolyte. The anode gas diffusion layer is located adjacent to the anode catalyst layer of the catalyst coated membrane assembly, and the cathode gas diffusion layer is located adjacent to the cathode catalyst layer of the catalyst coated membrane assembly. Further, the design is such that the following applies: the outer perimeter of the frame extends beyond the outer perimeters of the catalyst coated membrane assembly and the gas diffusion layers, the frame and the adhesive layer are located between the catalyst coated membrane assembly and one of the gas diffusion layers such that the adhesive layer is located adjacent to the catalyst coated membrane assembly and the frame is located adjacent to the one of the gas diffusion layers, the outer perimeter of the other of the gas diffusion layers extends beyond the outer perimeter of the catalyst coated portion of the catalyst coated membrane assembly, the inner perimeter of the adhesive layer extends beyond the inner perimeter of the frame, and the outer perimeter of the adhesive layer extends beyond the outer perimeter of the catalyst coated portion of the catalyst coated membrane assembly. Advantageously, in the present invention, the single adhesive layer bonds all the MEFA components together, by way of bonding the one of the gas diffusion layers to the catalyst coated membrane assembly, the catalyst coated portion of the catalyst coated membrane assembly to the frame; and bonds either the other of the gas diffusion layers to the frame, or an uncoated portion of the catalyst coated membrane assembly to the frame. MEFAs of the invention are for use in a solid polymer electrolyte fuel cell stack which comprises a series stack of a plurality of such membrane electrode and frame assemblies.

In exemplary embodiments, the one of the gas diffusion layers in the MEFA can be the anode gas diffusion layer. Further, the anode and cathode gas diffusion layers can comprise carbon fibre paper. The frame can be a polyethylene naphthalate film. And the frame can comprise ports for the fluids to be supplied to and the fluids to be removed from the fuel cell stack.

A suitable single adhesive layer for use in the invention may comprise a polymer selected from the group consisting of epoxies, urethanes, polyisobutylene, and polyolefins. For instance, the adhesive layer may comprise polyethylene and curable cross-linking agents and such an adhesive layer can be activated by a curing step.

In an optional embodiment in which the adhesive layer bonds an uncoated portion of the catalyst coated membrane assembly to the frame, the other of the gas diffusion layers can be bonded to an uncoated portion of the catalyst coated membrane assembly.

The associated method of manufacturing the aforementioned MEFA simply involves obtaining all the MEFA components (i.e. the catalyst coated membrane assembly, the anode and cathode gas diffusion layers, the frame and the adhesive layer), stacking and aligning the components in the arrangement as detailed above, and then activating the adhesive layer such that the adhesive layer bonds the one of the gas diffusion layers to the catalyst coated membrane assembly, bonds the catalyst coated portion of the catalyst coated membrane assembly to the frame, and bonds either the other of the gas diffusion layers to the frame or bonds an uncoated portion of the catalyst coated membrane assembly to the frame. Depending on the nature of the materials used in the adhesive layer, this activating step may involve curing, thermally activating, and/or chemically activating.

In an exemplary embodiment of the method, the adhesive layer may initially be obtained on a backing layer for ease of handling purposes during the stacking and aligning steps. Such a backing layer would be removed after stacking and aligning but before activating the adhesive layer.

In another exemplary embodiment of the method, the catalyst coated membrane may be bonded to the other of the gas diffusion layers before the stacking step, and then the outer edge of the bonded catalyst coated membrane and the other of the gas diffusion layers may be cut such that the outer perimeters of the catalyst coated membrane and the other of the gas diffusion layers are coterminous.

These and other aspects of the invention are evident upon reference to the attached Figures and following detailed description.

DESCRIPTION OF SPECIFIC EMBODIMENTS OF THE INVENTION

In this specification, words such as "a" and "comprises" are to be construed in an open-ended sense and are to be considered as meaning at least one but not limited to just one.

Herein, a "membrane electrode and frame assembly" (MEFA) refers to an individual assembly which, along with a frame, includes the membrane electrolyte and the two electrodes making up a single solid polymer electrolyte fuel cell in an associated fuel cell stack. A membrane electrode and frame assembly is designed such that a plurality of them can simply be stacked between appropriate flow field plate assemblies (e.g. bipolar plate assemblies or end plate assemblies) to complete most of the assembly of the stack.

"Activating" refers to a process which renders an adhesive layer "sticky" and capable of adhering to the various components in a MEFA. For instance, activating includes the process of curing a curable adhesive such as an epoxy. Activating also includes the process of thermally treating a thermosetting adhesive such as urethane or a polyisobutylene or a thermoplastic adhesive such as a polyolefin. Further, activating includes chemically treating a suitable chemically activated adhesive material (e.g. activating using UV radiation).

In the present invention, a single adhesive layer is used to manufacture membrane electrode and frame assemblies for a solid polymer electrolyte fuel cell stack. The related design and method of making offer advantages in simplicity and can provide a reduction in the undesirable discontinuities in thickness of some alternative designs. In an embodiment of the invention, the single adhesive layer provides the multiple required bonds in such a membrane electrode and frame assembly by forming a bond between one of the gas diffusion layers and the catalyst coated membrane assembly, a bond between the catalyst coated portion of the catalyst coated membrane assembly and the frame, and a bond between either: 1) the other of the gas diffusion layers and the frame, or 2) an uncoated portion of the catalyst coated membrane assembly and the frame. The design of the embodiment is characterized in that the outer perimeter of the frame extends beyond the outer perimeters of the catalyst coated membrane assembly and the gas diffusion layers, the frame and the adhesive layer are located between the catalyst coated membrane assembly and one of the gas diffusion layers such that the adhesive layer is located adjacent to the catalyst coated membrane assembly and the frame is located adjacent to the one of the gas diffusion layers, the outer perimeter of the other of the gas diffusion layers extends beyond the outer perimeter of the catalyst coated portion of the catalyst coated membrane assembly, the inner perimeter of the adhesive layer extends beyond the inner perimeter of the frame, and the outer perimeter of the adhesive layer extends beyond the outer perimeter of the catalyst coated portion of the catalyst coated membrane assembly.

Figure 1A:
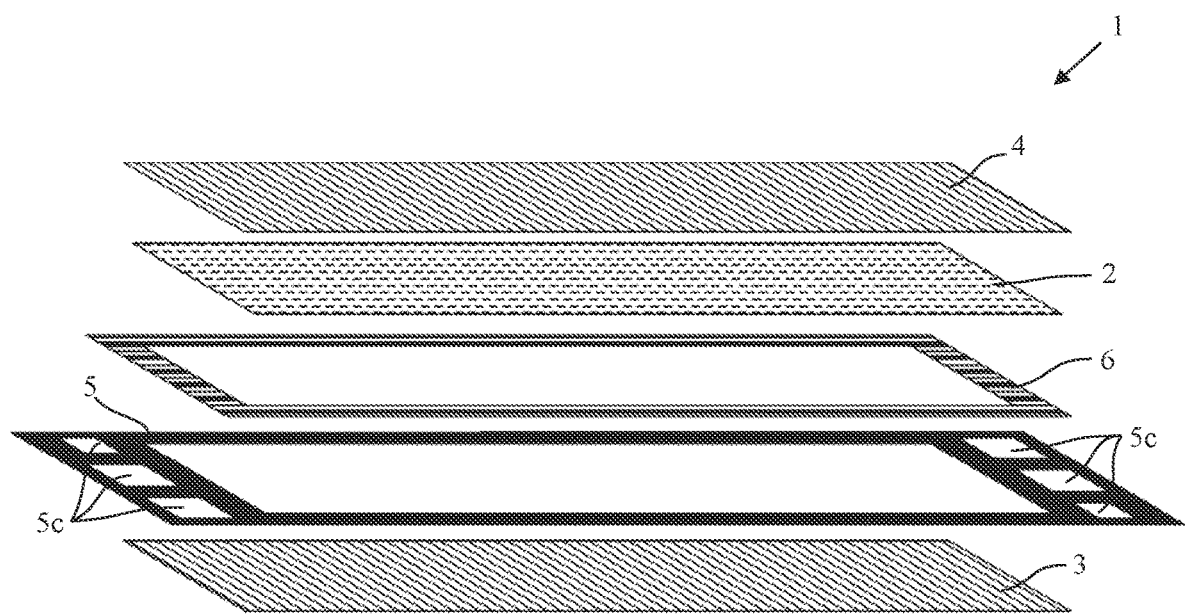
FIG. 1a shows an exploded schematic view of an embodiment of a membrane electrode and frame assembly of the invention.

FIG. 1a shows an exploded schematic view of an optional embodiment of a membrane electrode and frame assembly (MEFA) of the invention. Specifically, MEFA 1 comprises catalyst coated membrane assembly (CCM) 2, anode gas diffusion layer (anode GDL) 3, cathode gas diffusion layer (cathode GDL) 4, frame 5, and adhesive layer 6. CCM 2 comprises an anode catalyst layer, a cathode catalyst layer, and a solid polymer membrane electrolyte (not called out in FIG. 1a). Any suitable CCM 2 may be considered, including window coated or non-window coated CCMs. The anode and cathode catalyst layers are bonded to opposite sides of the solid polymer membrane electrolyte and serve as the anode and cathode electrodes in MEFA 1. Anode GDL 3 is located adjacent to the anode catalyst layer of CCM 2 and, in a like manner, cathode GDL 4 is located adjacent to the cathode catalyst layer of CCM 2. Frame 5 comprises numerous ports 5c for the fuel, oxidant, and coolant fluids supplied to and exhausted from the assembled fuel cell stack. Adhesive layer 6 is made of a material which can be activated so as to become sticky and to adhere to the various components in the MEFA thereby bonding them together.

Generally, frame 5 and adhesive layer 6 are located between CCM 2 and one of the GDLs 3 and 4. In the embodiment of FIG. 1, frame 5 and adhesive layer 6 are shown located between CCM 2 and anode GDL 3. In addition, adhesive layer 6 is located adjacent CCM 2 while frame 5 is located adjacent anode GDL 3.

In MEFA 1, anode and cathode GDLs 3 and 4 may be similar or different in construction but are typically made of carbon fibre paper and additionally may incorporate a variety of additives to modify flow, electrical conductivity, and/or wettability. Frame 5 is typically made of a suitable polymeric material, such as a polyethylene naphthalate film. Adhesive layer 6 is made of a thin activatable polymer such as an epoxy, a urethane, a polyisobutylene, or a polyolefin. In an exemplary embodiment, the adhesive layer comprises polyethylene and curable cross-linking agents and the polymer is activated by melting the polyethylene and curing the cross-linking agents.

Figure 1B:
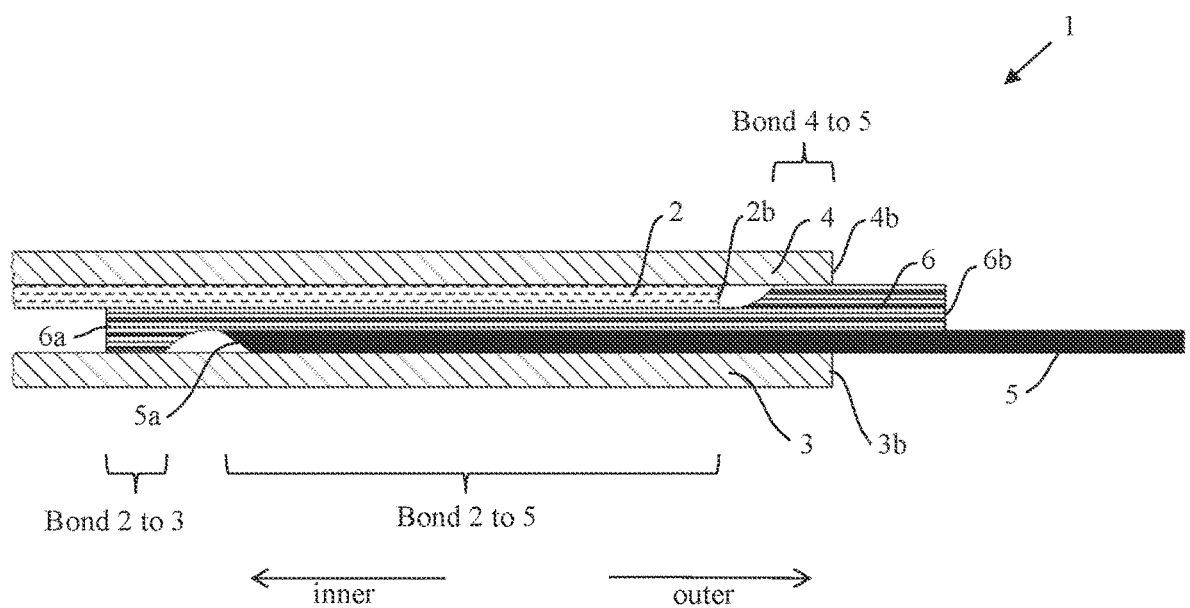
FIG. 1b shows a close-up side cross sectional view of the membrane electrode and frame assembly embodiment of FIG. 1a in the vicinity of the framing film.

FIG. 1b shows a close-up side cross sectional view of MEFA 1 in FIG. 1a in the vicinity of adhesive layer 6. As shown in FIG. 1b, the outer perimeter (not visible in FIG. 1b) of frame 5 extends beyond outer perimeters 2b, 3b, 4b of all of CCM 2 and GDLs 3 and 4 respectively. (The outer and inner directions are indicated with arrows in the close-up view of FIG. 1b.) Further as shown, outer perimeters 3b, 4b of both GDLs 3, 4 extend beyond outer perimeter 2b of CCM 2. Inner perimeter 6a of adhesive layer 6 extends beyond inner perimeter 5a of frame 5, and outer perimeter 6b of adhesive layer 6 extends beyond outer perimeter 2b of CCM 2. (In the exemplary embodiment of FIG. 1b, outer perimeter 6b of adhesive layer 6 is shown as extending beyond outer perimeter 4b of GDL 4 but this not essential. Preferably though, outer perimeter extends at least to outer perimeter 4b in order to effect the best bond possible.)

Adhesive layer 6 is thus positioned so that it alone is capable of effecting bonds between cathode GDL 4 and frame 5 (denoted as "Bond 4 to 5" in FIG. 1b), between CCM 2 and frame 5 (denoted as "Bond 2 to 5"), and between CCM 2 and anode GDL 3 (denoted as "Bond 2 to 3"). Aside from being a simpler design, the embodiment of FIGS. 1a and 1b advantageously reduces the magnitude of the discontinuities appearing within the MEFA when compared to some alternative designs of the prior art. For instance, in some prior art MEFA designs, inner perimeter 5a of frame 5 is flush with that of a different adhesive (or other) layer. The discontinuity arising from the combined thicknesses of both frame 5 and this other different layer at their inner perimeters creates a relatively large discontinuity in the MEFA and thus a relatively large stress point where component failure can and does occur in operating assembled fuel cell stacks. In the present design however, inner perimeter 6a of adhesive layer 6 extends beyond inner perimeter 5a of frame 5 and thus these discontinuities are offset thereby reducing the stress and chance of failure.

The method of manufacturing a membrane electrode and frame assembly can also be simplified by adopting the aforementioned design. After obtaining all the required components, they merely need to be stacked and aligned as described in detail above and then bonded together. The bonding step involves activating the adhesive layer (with the components typically under modest compression) such that the adhesive layer effects the aforementioned bonds between all the components. The bonding of all the components may be accomplished via a single activation step or alternatively via more than one activation step (e.g. in which a bonded subassembly is created from two or more of the MEFA components via an initial activation step and the remainder of the components are bonded via one or more additional activation steps.) For handling purposes during the stacking and aligning steps, it may be desirable to obtain the adhesive layer on a backing layer which is removed after stacking and aligning but before activating the adhesive layer.

Figure 2:
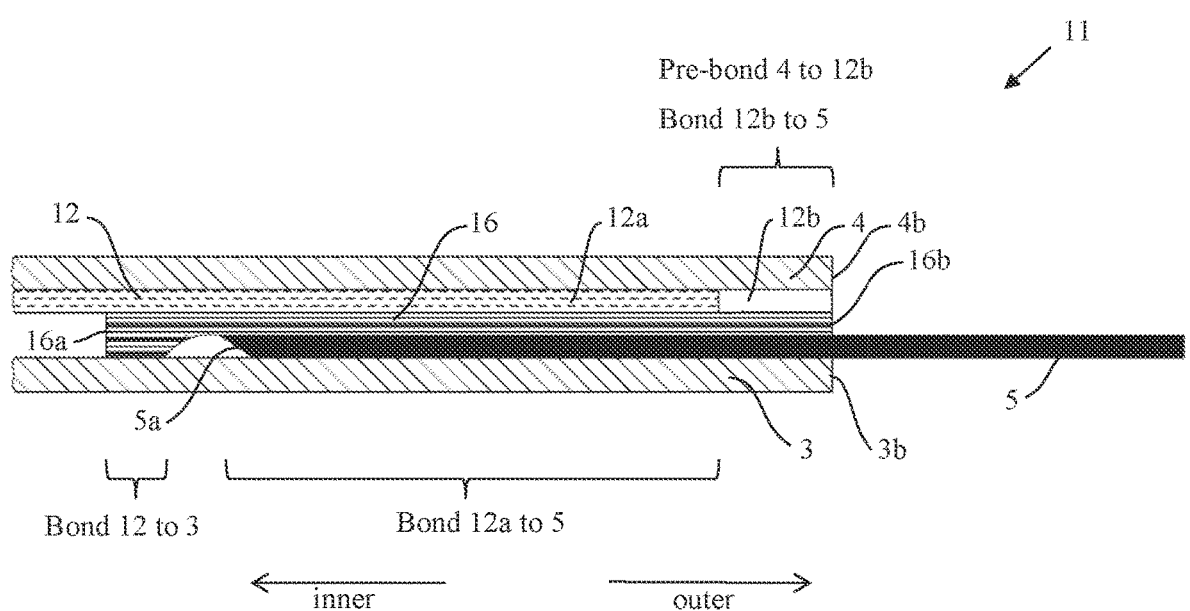
FIG. 2 shows a close-up side cross sectional view of an alternative membrane electrode and frame assembly embodiment of the invention in the vicinity of the framing film.

FIG. 2 shows a close-up side cross sectional view of an alternative optional embodiment of a membrane electrode and frame assembly (MEFA) of the invention in the vicinity of the framing film. (Note that the same numbers have been used to identify elements in the embodiment of FIG. 2 that are common to elements appearing in FIGS. 1a and 1b.)

As is apparent in FIG. 2, MEFA 11 in this alternative embodiment is very similar to that of FIGS. 1a and 1b. CCM 12 and adhesive layer 16 however differ slightly. In this embodiment, the outer perimeters of CCM 12, cathode GDL 4, and adhesive layer 16 are coterminous. Further, not all of CCM 12 is coated with catalyst. Instead, a large central portion of CCM 12 is coated with catalyst, namely coated portion 12a, but an uncoated portion 12b is provided at its outer perimeter. In this embodiment, adhesive layer 16 serves to effect a bond between CCM 12 and frame 5. Specifically, uncoated portion 12b of the CCM is bonded to frame 5 via outer perimeter 16b of the adhesive layer (denoted as "Bond 12b to 5") and coated portion 12a of the CCM is also bonded to frame 5 via the inner portion of adhesive layer (denoted as "Bond 12a to 5"). Adhesive layer 16 also serves to effect a bond between CCM 12 and anode GDL 3 (denoted as "Bond 12 to 3"). In this embodiment, cathode GDL 4 is desirably pre-bonded to CCM 12 at uncoated portion 12*b* in an earlier assembly step (denoted "Pre-bond 4 to 12*b*").

The design illustrated in FIG. 2 advantageously removes the requirement of bonding one of the GDLs to the frame 5 and instead transfers this requirement to uncoated edge of CCM 12. In turn, this allows the amount that the GDLs and adhesive layer extend beyond the CCM to be reduced. Indeed, they can now be coterminous with CCM 12 as shown in FIG. 2. Thus, the overall non-active area of MEFA 11 can be reduced, thereby improving power density. In addition, this design advantageously allows for CCM 12 to be pre-bonded during assembly to one of the GDLs (GDL 4 in FIG. 2) which would simplify the manufacture of MEFA 11 overall. (This minimizes the need to handle a discrete CCM which is dimensionally unstable and thus difficult to handle. However, once laminated to a rigid GDL, it can be handled and positioned much more precisely.) Thereafter, the outer edge of the pre-bonded CCM/GDL can be cut in a single simple step such that the outer perimeters of both CCM and GDL are coterminous.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A membrane electrode and frame assembly for a solid polymer electrolyte fuel cell stack comprising:
    a catalyst coated membrane assembly comprising an anode catalyst layer, a cathode catalyst layer, and a solid polymer membrane electrolyte wherein the anode and cathode catalyst layers are bonded to opposite sides of the solid polymer membrane electrolyte;
    an anode gas diffusion layer adjacent to the anode catalyst layer of the catalyst coated membrane assembly;
    a cathode gas diffusion layer adjacent to the cathode catalyst layer of the catalyst coated membrane assembly;
    a frame; and
    an adhesive layer that is dimensionally flat;
        wherein outer perimeters of the catalyst coated membrane, the cathode gas diffusion layer and the adhesive layer are coterminous;
        wherein:
        the outer perimeter of the frame extends beyond the outer perimeters of the catalyst coated membrane assembly and the gas diffusion layers;
        the frame and the adhesive layer are located between the catalyst coated membrane assembly and one of the gas diffusion layers such that the adhesive layer is located adjacent to the catalyst coated membrane assembly and the frame is located adjacent to the one of the gas diffusion layers;
        the outer perimeter of the other of the gas diffusion layers extends beyond the outer perimeter of the catalyst coated portion of the catalyst coated membrane assembly;
        the inner perimeter of the adhesive layer extends beyond the inner perimeter of the frame;
        the outer perimeter of the adhesive layer extends beyond the outer perimeter of the catalyst coated portion of the catalyst coated membrane assembly,
    wherein the adhesive layer bonds the one of the gas diffusion layers to the catalyst coated membrane assembly, bonds the catalyst coated portion of the catalyst coated membrane assembly to the frame, and bonds either:
        the other of the gas diffusion layers to the frame, or
        an uncoated portion of the catalyst coated membrane assembly to the frame.

2. The membrane electrode and frame assembly of claim 1 wherein the one of the gas diffusion layers is the anode gas diffusion layer.

3. The membrane electrode and frame assembly of claim 1, wherein the anode and cathode gas diffusion layers comprise carbon fibre paper.

4. The membrane electrode and frame assembly of claim 1, wherein the frame is a polyethylene naphthalate film.

5. The membrane electrode and frame assembly of claim 1 wherein the frame comprises ports for the fluids to be supplied to and the fluids to be removed from the fuel cell stack.

6. The membrane electrode and frame assembly of claim 1, wherein the adhesive layer comprises a polymer selected from the group consisting of epoxies, urethanes, polyisobutylene, and polyolefins.

7. The membrane electrode and frame assembly of claim 6 wherein the adhesive layer comprises polyethylene and curable cross-linking agents.

8. The membrane electrode and frame assembly of claim 1, wherein the adhesive layer bonds the other of the gas diffusion layers to the frame.

9. The membrane electrode and frame assembly of claim 1, wherein the adhesive layer bonds an uncoated portion of the catalyst coated membrane assembly to the frame.

10. The membrane electrode and frame assembly of claim 9 wherein the other of the gas diffusion layers is bonded to an uncoated portion of the catalyst coated membrane assembly.

11. A solid polymer electrolyte fuel cell stack comprising a series stack of a plurality of the membrane electrode and frame assemblies of claim 1.

12. A method of manufacturing the membrane electrode and frame assembly of claim 1 comprising:
    obtaining the catalyst coated membrane assembly;
    obtaining the anode and cathode gas diffusion layers;
    obtaining the frame and the adhesive layer;
    stacking the catalyst coated membrane assembly, the anode and cathode gas diffusion layers, the frame, and the adhesive layer such that the frame and the adhesive layer are located between the catalyst coated membrane assembly and one of the gas diffusion layers and such that the adhesive layer is located adjacent to the catalyst coated membrane assembly and the frame is located adjacent to the one of the gas diffusion layers;
    aligning the catalyst coated membrane assembly, the anode and cathode gas diffusion layers, the frame, and the adhesive layer such that the outer perimeter of the frame extends beyond the outer perimeters of the catalyst coated membrane assembly and the gas diffusion layers, the outer perimeter of the other of the gas diffusion layers extends beyond the outer perimeter of the catalyst coated portion of the catalyst coated membrane assembly, the inner perimeter of the adhesive layer extends beyond the inner perimeter of the frame, and the outer perimeter of the adhesive layer extends beyond the outer perimeter of the catalyst coated portion of the catalyst coated membrane assembly; and activating the adhesive layer such that the adhesive layer bonds the one of the gas diffusion layers to the catalyst coated membrane assembly, bonds the catalyst coated portion of the catalyst coated membrane assembly to the frame, and bonds either:
- the other of the gas diffusion layers to the frame, or
- an uncoated portion of the catalyst coated membrane assembly to the frame.

13. The method of claim 12 wherein the one of the gas diffusion layers is the anode gas diffusion layer.

14. The method of claim 12, wherein the adhesive layer is obtained on a backing layer and the method comprises:
removing the backing layer after stacking and aligning the adhesive layer and before activating the adhesive layer.

15. The method of claim 12 comprising:
bonding the catalyst coated membrane to the other of the gas diffusion layers before the stacking step; and
cutting the outer edge of the bonded catalyst coated membrane and the other of the gas diffusion layers such that the outer perimeters of the catalyst coated membrane and the other of the gas diffusion layers are coterminous.

* * * * *